United States Patent [19]
Smith

[11] Patent Number: 5,820,206
[45] Date of Patent: Oct. 13, 1998

[54] OPENING ROOF FOR A VEHICLE

[75] Inventor: Robert Smith, Wolverhampton, Great Britain

[73] Assignee: Inalfa Industries B.V., Netherlands

[21] Appl. No.: 719,485

[22] Filed: Sep. 25, 1996

[30] Foreign Application Priority Data

Sep. 26, 1995 [NL] Netherlands ............................ 1001283

[51] Int. Cl.⁶ ...................................................... B06J 7/12
[52] U.S. Cl. ............................ 296/219; 296/223; 296/224
[58] Field of Search .................................... 296/216, 219, 296/223, 224

[56] References Cited

U.S. PATENT DOCUMENTS

| | | | |
|---|---|---|---|
| 2,774,624 | 12/1956 | Lower | 296/137 |
| 4,134,611 | 1/1979 | Craven et al. | 296/224 |
| 5,018,783 | 5/1991 | Chamings et al. | 296/219 |

FOREIGN PATENT DOCUMENTS

| | | | |
|---|---|---|---|
| 603834 | 6/1994 | European Pat. Off. | 296/219 |
| 1003972 | 3/1952 | France . | |
| 558031 | 8/1932 | Germany . | |
| 643380 | 4/1937 | Germany | 296/224 |
| 201483 | 5/1939 | Switzerland | 296/219 |
| 1539906 | 2/1979 | United Kingdom | 296/219 |

*Primary Examiner*—Dennis H. Pedder
*Attorney, Agent, or Firm*—Westman, Champlin & Kelly P.A.; S. Koehler

[57] ABSTRACT

An opening roof for a vehicle having an opening in the fixed roof, comprises a frame to be mounted around the opening, a flexible cover for selectively closing or exposing the opening, a control beam attached to the front side of the cover and being guided with its lateral ends in guide rails extending along each side of the opening in longitudinal direction of the vehicle, and a latch for holding the control beam in a forward position when the opening roof is closed. Said latch includes at least a latch member which is operative between the control beam and the frame. An electric motor is coupled to the control beam through drive cables in order to slide it for opening and closing the opening roof. A transmission mechanism between the latch member and the drive cables ensures to tighten the control beam into the forward position with a greater driving force during its last closing movement.

14 Claims, 5 Drawing Sheets

OPENING ROOF FOR A VEHICLE

BACKGROUND OF THE INVENTION

1. Field of the Invention

The present invention relates to an opening roof for a vehicle having an opening in the fixed roof, comprising a frame to be mounted around the opening, a flexible cover for selectively closing or exposing the opening, a control beam attached to the front side of the cover and being guided with its lateral ends in guide rails extending along each side of the opening in longitudinal direction of the vehicle, and latch means for holding the control beam in a forward position when the opening roof is closed, said latch means including at least a latch member which is operative between the control beam and the frame.

2. Description of the Related Art

In opening roofs it is a problem to lock the control beam together with a cover due to the required force to obtain the desired tension in the cover in order to effect a smooth appearance, sufficient stability and a proper seal in the closed position. Most of the opening roofs open and close rather slow in connection with this force required during locking since the driving force will be insufficient to tighten the opening roof in the closed position. In a well-known manually operated opening roof, the control beam is provided with a fixed handle which is used to slide the control beam in order to open and close the opening roof. The control beam also includes a rotating handle which, upon rotation, activates a locking mechanism having a latch member to accomplish the locking action between the control beam and the opening roof frame. This operation is cumbersome and inconvenient.

SUMMARY OF THE INVENTION

It is an object of the invention to provide an opening roof of the type mentioned in the preamble in which this problem is removed in an effective way.

For this purpose, the opening roof according to the invention is characterised by drive means coupled to the control beam in order to slide it for opening and closing the opening roof, and a transmission mechanism between the latch member and the drive means to tighten the control beam into the forward position with a greater driving force during its last closing movement.

The drive means, for example an electric motor or a crank, which effects all movements of the control beam of the opening roof or only the opening and closing movement thereof, takes over the manual locking and unlocking operations of the control beam of the opening roof. The transmission mechanism ensures that the drive means are able to cause the required high closing force through the latch member.

It is possible that the transmission mechanism is continuously operative but it is preferred according to the invention that the transmission mechanism comprises a locking member such that the drive means drive the control beam without intervention of the transmission mechanism as long as the locking member is operative, there being provided an unlocking member for releasing the locking action of the locking member and for activating the transmission mechanism when approaching the forward position of the control beam.

In this manner, the normal opening and closing movements can take place relatively quick and the transmission mechanism, or reduction mechanism respectively, are only made operative when this is necessary to effect a high closing and locking force.

Preferably, the drive means comprises connecting members, for example glide shoes, guided in the guide rails and being slidable by an electric motor through drive cables. In this embodiment, the latch member may be mounted on the control beam, and the transmission mechanism is then operative between the latch member and one of the connecting members.

The invention will hereafter be further explained with reference to the drawings showing an embodiment of the opening roof according to this invention in a schematic fashion.

DESCRIPTION OF THE PREFERRED EMBODIMENTS

Figure 1:
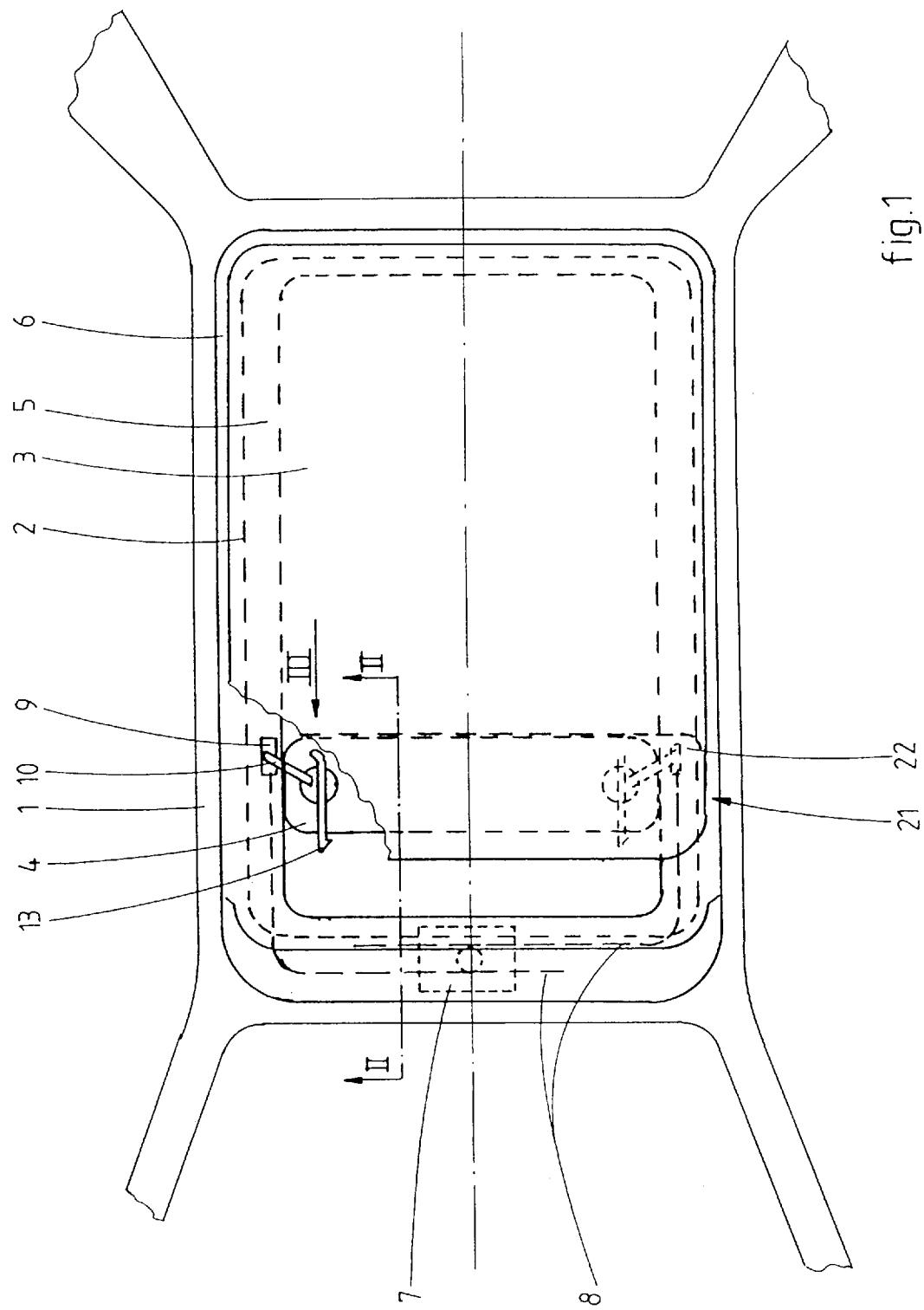
FIG. 1 is a schematic plan view of a vehicle roof including the exemplary embodiment of the opening roof according to the invention.
Figure 2:
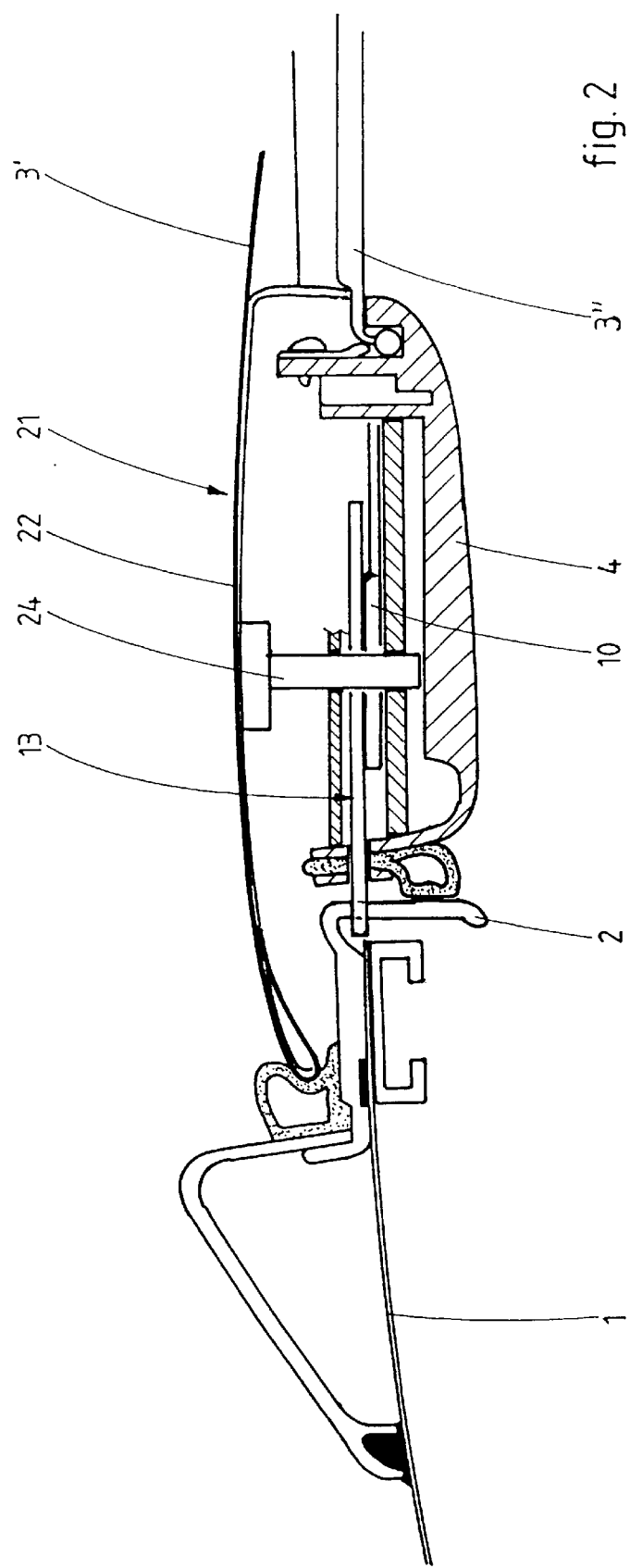
FIG. 2 is an enlarged schematic sectional view along the line II—II of FIG. 1 in closed position of the opening roof.

The drawing and first of all FIGS. 1 and 2 show a fixed groove 1 of the vehicle which is provided with an opening 2 therein to receive the opening roof according to the invention. The opening roof comprises a flexible cover 3 consisting of an outer cover 3' and an inner cover 3" on the front side of which there is arranged a front carrier 21. In this embodiment by a way of example, the front carrier 21 consists of a transverse control beam 4 to which the inner cover 3" is attached and of a rigid covering plate 22 mounted on the control beam 4 and to which the outer cover 3' is fixed. By sliding the control beam 4 forwardly or backwardly, the cover 3 can be folded to expose the roof opening 2 or can be folded-out again for closing the roof opening 2. The manner of folding and guiding the cover 3 does not form part of the present invention and for a possible embodiment thereof reference is made to European Patent application 0 606 730 which is incorporated herein by reference thereto.

In order to guide the control beam 4 and glide shoes of the cover 3 (not shown) there are arranged guiderails 5 on the longitudinal sides of the roof opening 2, which extend in longitudinal direction of the vehicle roof 1 and may be mounted on or may form part of a stationary frame 6, which is attached to the lower or upper side of the vehicle roof 1. On the other hand, it would also be possible to attach the guide rails 5 to the vehicle roof 1 without interposition of the stationary frame 6.

For driving the control beam 4 there is arranged, in this exemplary embodiment, an electric motor 7, which is mounted to the front or rear side of the stationary frame 6 and is adapted to slide glide shoes 9 in the guide rails 5 through usual drive cables 8. The glide shoes 9 serve as connecting members and are connected to the control beam 4 by elements to be described further on in greater detail, such that the synchronised displacement of both glide shoes 9 cause a displacement of the control beam 4.

Figure 3:
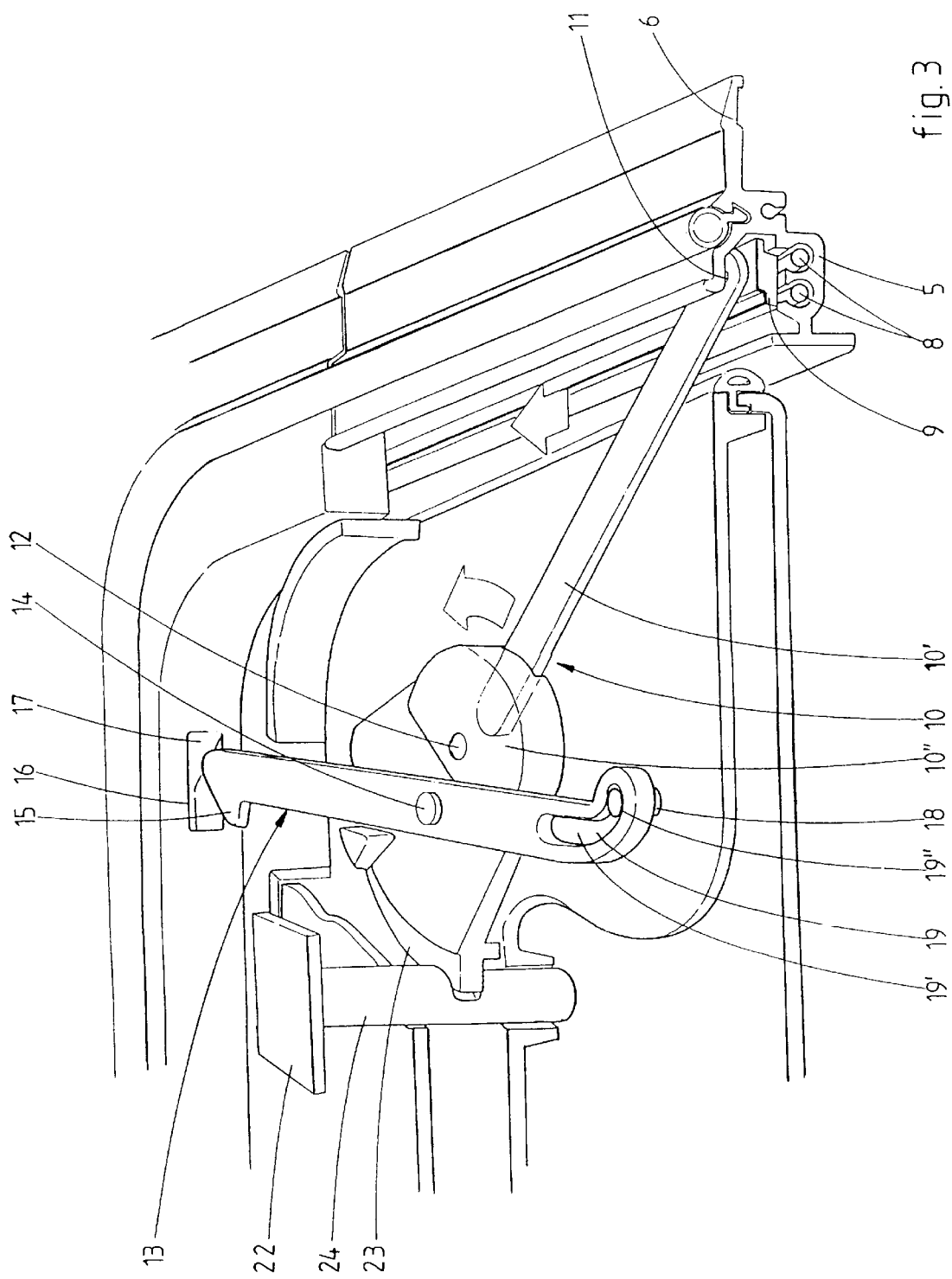
FIG. 3 is an enlarged partially broken away perspective view of detail III of FIG. 1.

FIG. 3 shows in detail the elements with which the glide shoes 9 engage the control beam 4. FIG. 3 shows the elements on one side of the opening roof, wherein it should be kept in mind that the same elements are provided on the opposite longitudinal side but in mirror image.

In the embodiment shown, the glide shoe 9 is coupled through a lever 10 to the control beam 4, in which the lever 10, is mounted on the glide shoe 9 through a vertical pivot, pin 11 and is pivotally connected to the control beam 4 through a vertical pivot pin 12. In order to enable a rotation of the lever 10 during a rectilinear movement of the glide shoe 9, the lever 10 is made up of two parts 10' and 10" which are freely slidable with respect to each other in longitudinal direction of the lever 10.

The part 10" of the lever 10 connected to the control beam 4 is equipped with a latch member 13 which is mounted pivotally on the part 10" of the lever 10 by means of a vertical pivot pin 14. The latch member 13 extends substantially in longitudinal direction of the opening roof and projects forwardly relative to the control beam 4 and is provided there with a hook 15 serving as latch of the control beam 4 in the closed position of the opening roof. For this purpose, the hook 15 is adapted to co-operate with a counter-member 16 constructed as a recess having a partial front wall in the transverse front portion of the stationary frame 6. The counter-member 16 has an inclined face 17 to which the front end of the latch member 13 abuts when approaching the closed position and which causes the latch member 13 to rotate about its pivot pin 14 in order to cause the hook 15 and the counter-member 16 to engage.

Figure 4:
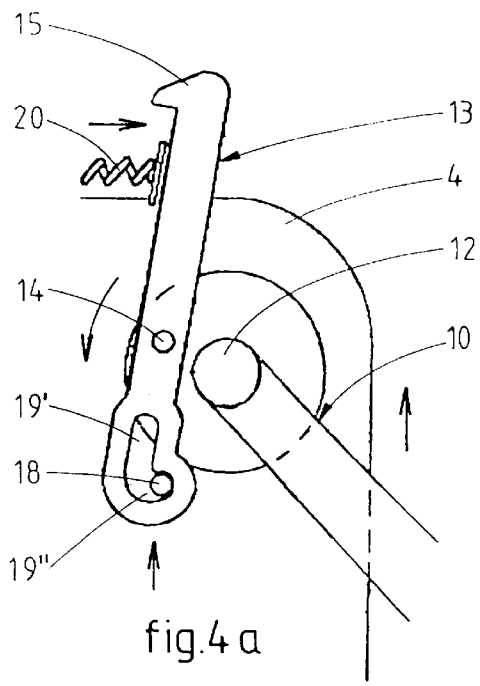
FIG. 4a–h are out-lined plan views of detail III of FIGS. 1 and 3 in various positions upon opening and closing the opening roof.
Figure 4:
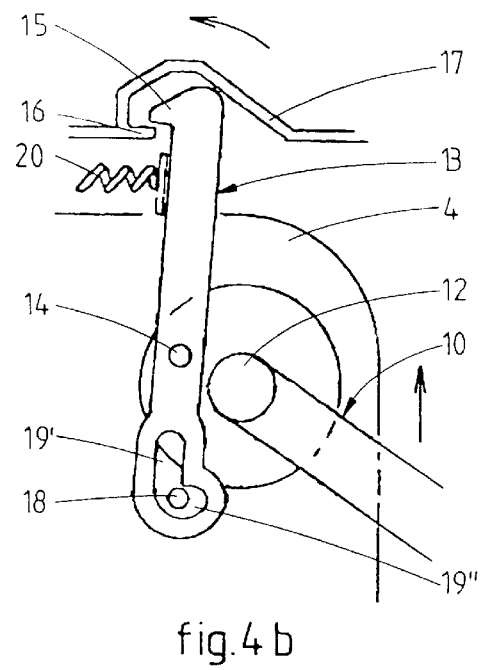
Figure 4:
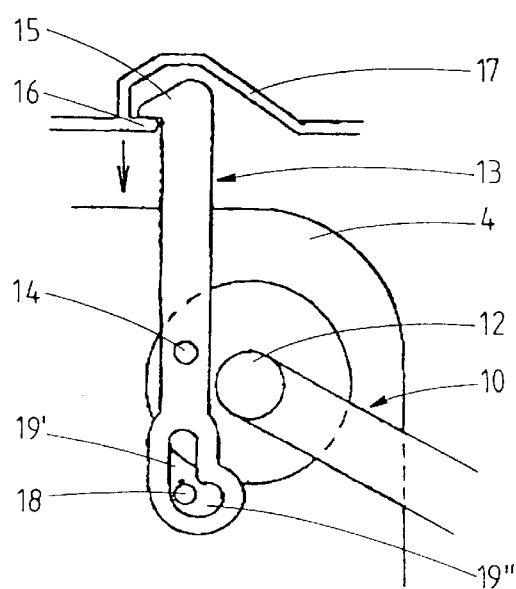
Figure 4:
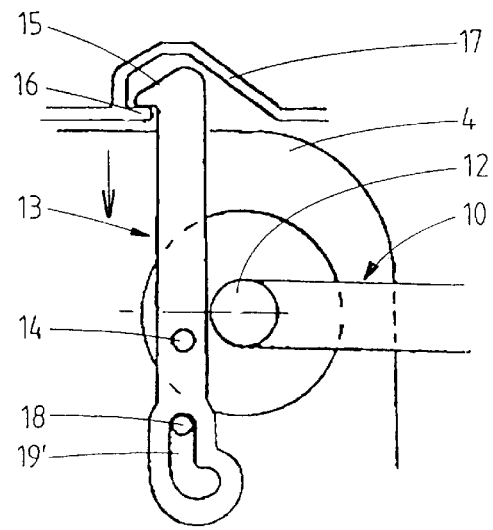
Figure 4:
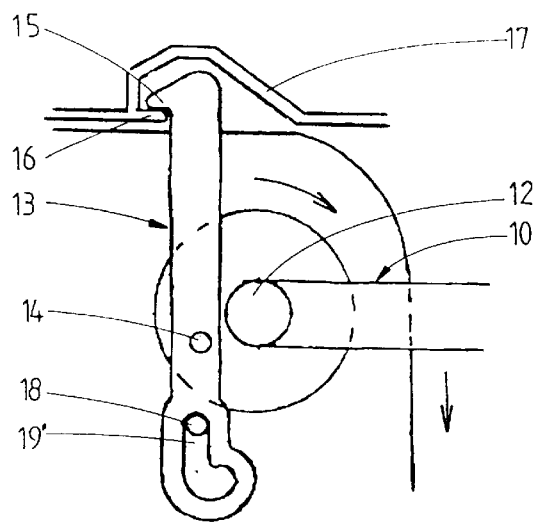
Figure 4:
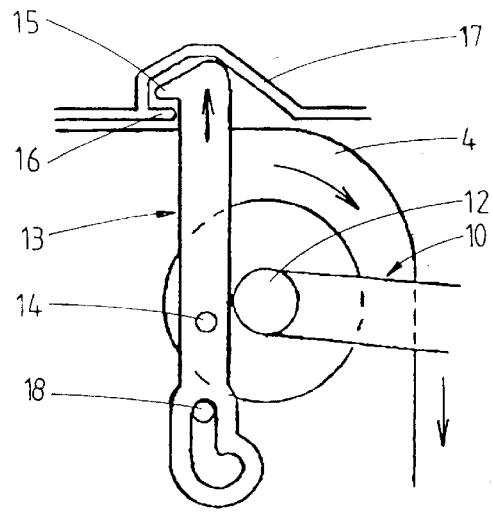
Figure 4:
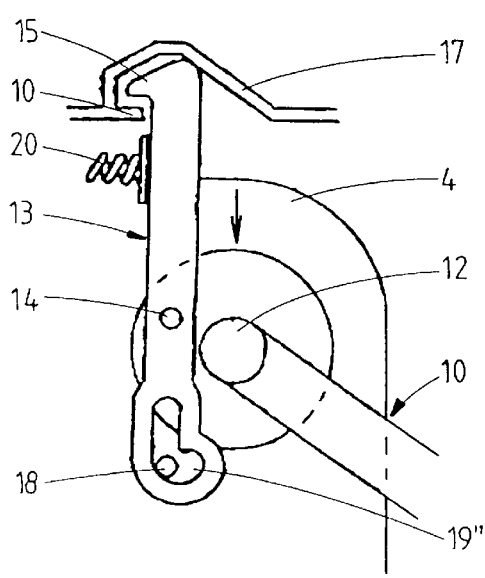
Figure 4:
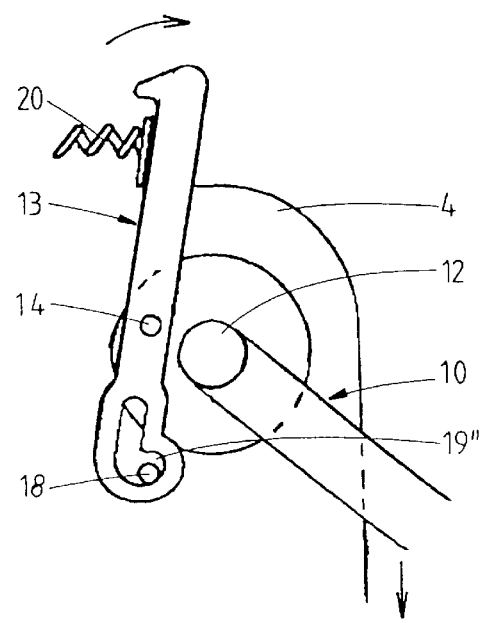

At the rear end of the latch member 13 facing away from the hook 15 is a locking member constructed as a locking pin 18 fixed on the control beam 4 and engaging into a locking slot 19 in the latch member 13. This locking slot 19 has two portions together forming substantially a J, that is a portion 19' extending substantially in longitudinal direction of the latch member 13 and a slightly curved portion 19" extending substantially transverse thereto. When the locking pin 18 is in the portion 19' then it locks the latch member 13 against a rotation about the pivot pin 14, when the hook 15 is in engagement with the counter-member 16. During the presence of the locking pin 18 in the slot portion 19', the displacement of the latch member 13 in longitudinal direction is prevented, thereby blocking a rotation of the lever 10 about pivot pin 12 and rendering the lever 10 immovable relative to the control beam 4. This means that there is no transmission mechanism active between glide shoe 9, and control beam 4 and consequently there is realised a 1:1 drive of the control beam 4 by the glide shoe 9. The operation of the complete assembly will be explained further on with reference to FIG. 4.

As is not shown in FIG. 3, but in FIG. 4a, the latch member 13 is equipped with a spring member 20 acting thereon and loading the latch member 13 in a direction opposite to the locking movement of the latch member 13, during which the hook 15 engages with the counter-member 16. The spring member 20 also holds the locking pin 18 in engagement with the slot portion 20". The spring member 19 is shown only very schematically in FIGS. 4a–h, but the structure thereof is such that it allows a sliding movement of the latch member 13 relative to the control beam 4. FIG. 3 further shows that the part 10" of the lever 10 is provided on its free end with a control rib 23 extending helically around the pivot pin 12 and being in engagement with a groove 25 formed in a vertical pin 24. The pin 24 is guided in the control beam 4 in a vertically movable fashion and is fixed on its upper side to the covering plate 22. In this manner it is possible to use the rotation of the lever 10 for tightening and locking the control beam 4 to simultaneously adjust the covering plate 22 height-wise to tighten the covering plate 22 with its front side against the fixed roof 1 or the frame 6 in a sealing fashion. During unlocking there is of course a reverse movement The operation of the total structure shown in FIG. 3 will now be explained with reference to FIGS. 4a–h.

FIG. 4a shows the position of the lever 10 and of the latch member 13 when the control beam 4 of the cover 3 is displaced at least 15 mm backwardly from the closed position. In each open position of the opening roof the elements 10 and 13 are consequently in this position. In this position, the locking pin 18 is in engagement with the portion 19" of the locking slot 19 and this position is maintained due to the load on the latch member 13 by the spring member 20. Since the wall of the portion 19" of the locking slot 19 facing the front side of the opening roof forms a hook, the locking pin 18 remains in the portion 19, also when a backwardly directed force is exerted on the latch member 13. Due to the blockage of the latch member 13 in longitudinal direction of the opening roof, the lever 10 is locked against rotation because, due to mounting the latch member 13 through the pivot pin 14 at a distance from the pivot pin 12 between the lever 10 and the control beam 4, there is no possibility for a rotation of the lever 10 without sliding the latch member 13 in longitudinal direction of the opening roof. Due to this blockage of the lever 10 it ensures a fixed connection between the front plate 4 and the glide shoe 9 so that the control beam 4 follows each movement of the glide shoe 9 in a ratio of 1:1 and can be displaced to the open or closed position respectively, when the glide shoe 9 is displaced through the drive cables 8 driven by the electric motor 7. In this manner, the opening roof may be opened or closed to the desired extent. From this position the control beam 4 will now be moved to the closed position, by sliding the glide shoe 9 (not shown) forwardly.

In FIG. 4b, the position of the control beam 4 is obtained in which the front end of the latch member 13 near the hook 15 has abut against the inclined face 17 of the counter-member 16. In FIG. 4b, the control beam 4 is already moved slightly forwardly after the latch member 13 has come in engagement with the inclined face 17 and as a result the latch member 13 is rotated about the pivot pin 14 on the lever 10 against the spring force of the spring member 20 due to the inclined face 17, thereby bringing the hook 15 of the latch member 13 laterally in engagement with the counter member 16. The locking pin 18 does not prevent this rotation of the latch member 13 since the locking pin 18 is free to move to the portion 19' of the locking slot 19 in the latch member 13.

In FIG. 4c, the hook 15 has come fully in engagement with the counter-member 16 which takes place in about 12 mm from the front position of the control beam 4. The tension on the cover 3 of the opening cover is then already such that it requires a heavy force to move the control beam 4 further forwardly. Since the locking pin 18 is now fully in the portion 19' of the locking slot 19 in the latch member 13, the lever 10 is no longer locked against rotation as the latch member 13 is now able to slide relative to the control beam 4 and then the locking pin 18 moves through the portion 19' of the locking slot 19. In the position of FIG. 4c, the pivot pin 14 between the latch member 13 and the lever 10 then starts to operate substantially as a fixed pivot of the lever 10, in which the counter-member 16 absorbs the force on the latch member 13. The lever 10 is then able to actually act as a lever in which the pivot pin 12 of the lever 10 and consequently the control beam 4 is moved forwardly with a transmission ratio relative to the glide shoe 9 which depends on the ratio of the distances between the pivot pins 12 and 14 on the one hand, and between the pivot pins 12 and 11 on the other hand. This transmission ratio may for example be 1:4. As a result it is possible to exert a force on the control beam 4 which is four times as great as with a direct transmission. It is thus clear that the lever 10 starts to operate as transmission or reduction mechanism between the driving glide shoe 9 and the control beam 4 after release by the locking pin 18.

FIG. 4d shows the fully closed and locked position of the opening roof in which the locking pin 18 has arrived at the front end of the locking slot 19 and consequently there is no possibility for a further forward sliding movement of the latch member 13 relative to the control beam 4. As soon as the locking pin 18 is in the portion 19' of the locking slot 19, a substantial rotation of the latch member 13 about the pivot pin 14 is not possible anymore so that the hook 15 is kept in engagement with the counter member 16 and this ensures a reliable locking of the opening roof in the closed position. In this situation the locking pin 18 operates as blockage of the latch member 13.

FIG. 4e corresponds to FIG. 4d and shows the start of the unlocking operation of the opening roof in order to open it. For this purpose the glide shoe 9 and consequently the pivot pin 11 of the lever 10 is displaced backwardly.

In FIG. 4f, the glide shoe 9 is moved slightly backwardly and the lever 10 is rotated slightly. If then the control beam 4 is not already moved along backwardly due to the force exerted thereon by the tension in the cover 3, the latch member 13 will move forwardly due to the rotation of the lever 10 and will abut against the inclined face 17 or another portion of the front wall of the recess of the counter member 16, whereafter the pivot pin 14 between the latch member 13 and the lever 10 will act again as substantially fixed pivot and the control beam 4 will be forced back rearwardly through the pivot pin 12 with a speed reduction in respect of the glide shoe 9.

In FIG. 4g, the control beam 4 has reached the position in which the locking pin 18 has left the portion 19' of the locking slot 19 and consequently the latch member 13 is able again to pivot around the pivot pin 14 and due to the influence of the spring member 20 this will happen and this will bring the hook 15 out of engagement with the counter-member 16 so that the control beam 4 is permitted to follow the glide shoe 9 with a 1:1 ratio.

FIG. 4h shows again the position of the lever 10 and the latch member 13 in the open position of the opening roof. The locking pin 18 remains in engagement with the rear wall of the locking slot 19 until a forward force is exerted again on the locking pin positioning the locking pin 18 again in the same position relative to the locking slot 19 as shown in FIG. 4a.

From the foregoing it will be clear that the invention provides an opening roof which, on the one hand, enables a normal drive of the control beam with a relatively high speed and, on the other hand, automatically enables the same drive to exert a greater force on the control beam through a reduction or transmission mechanism coming into operation at the end of the closing movement for tensioning the cover of the opening roof and for tightening the front covering plate in a sealing fashion.

The invention is not restricted to the embodiment shown in the drawing and described herein before which may be varied in different manners within the scope of the invention. For example, it is possible to have the electric motor engage the latch member directly through a transmission mecha-nism and not through the glide shoes. For this purpose, the electric motor may be mounted in a moveable fashion, for example being slidable or rotatable against a spring force, and after exceeding a predetermined force it may load the engaged latch member in order to tension the control beam. The transmission mechanism may be constructed in another way rather than a lever, for example with gear wheels. Instead of a hook also another type of latch may be used.

I claim:

1. An opening roof assembly for a vehicle having an opening in a fixed roof, the opening roof assembly comprising
  a frame to be mounted around the opening having guide rails extending along each side of the opening in a longitudinal direction of the vehicle;
  a flexible cover for selectively closing or exposing the opening;
  a control beam attached to an opening side of the cover;
  a latch member moveable with the control beam and selectively fixable with respect to the frame in the longitudinal direction;
  a pivotable lever pivotally coupled to the latch member and having a portion carried by the control beam, the latch member having a locking member for allowing the pivotable lever to be pivotable to displace the control beam when the latch member is fixed with respect to the frame in the longitudinal direction and to be non-pivotable when the latch member is moveable with respect to the frame; and
  a connecting member coupled to an end of the pivotable lever remote from the latch member, the connecting member being displaceable longitudinally with respect to the frame to pivot the pivotable lever.

2. The opening roof according to claim 1 wherein the locking member includes a portion of a pin-slot connection forming a locking device for selectively preventing pivotable motion of the pivotable lever.

3. The opening roof according to claim 1, and further comprising a drive member coupled to the connecting member, wherein the connecting member is guided in one of the guide rails.

4. The opening roof according to claim 3, wherein the latch member is mounted on the control beam.

5. The opening roof according to claim 2, wherein the latch member comprises a hook which is directed forwardly and automatically comes into engagement with a counter-member on the frame due to the forward movement of the control beam, said engagement of the hook with the counter-member moving the portion of the pin-slot connection of the latch member to release the pivotable lever for pivotable movement.

6. The opening roof according to claim 5, wherein at least one of the counter-member and the hook comprises an inclined face in order to rotate the latch member about a pivot pin for bringing the hook into engagement with the counter-member, the opening roof further including a spring member coupled to the latch member to move the portion of the pin-slot connection of the latch member to inhibit pivotal movement of the pivotable lever.

7. The opening roof according to claim 5 wherein the locking device includes a pin and slot connection formed between the control beam and the latch member, the slot including a first portion allowing pivotal movement of the pivotable lever and a second portion not allowing pivotal movement of the pivotable lever.

8. The opening roof according to claim 1, wherein the pivotable lever includes two relatively moveable parts forming the connection from the connecting member to the latch member.

9. The opening roof according to claim 8, wherein the pivotable lever is pivotally connected to the control beam.

10. The opening roof according to claim 8, wherein the pivotable lever comprises two relatively telescopically slidable parts to absorb different distances between the latch member and the connecting member.

11. The opening roof according to claim 3, wherein two latch members and two connecting members are provided, and wherein one of the latch members is positioned near each lateral edge of the control beam, and wherein each latch member is connected to one of the connecting members arranged at each respective lateral edge.

12. The opening roof according to claim 2 and further comprising an electric motor and drive cables connected to the connecting member.

13. The opening roof according to claim 1, and further comprising:

a height-adjustable rigid covering plate mounted on the control beam and to which the cover is fixed;

a seal operative between the roof and at least one of the control beam and the covering plate; and a displacement mechanism for displacing the covering plate to effectuate the seal, the displacement mechanism being operable during locking and unlocking of the control beam.

14. The opening roof according to claim 13, wherein the displacement mechanism for the covering plate comprises a height-adjusting member having a groove and wherein the pivotable lever includes a drive member operable with the groove to selectively displace the height-adjusting member.

* * * * *